(12) United States Patent
Kushita

(10) Patent No.: US 7,197,300 B2
(45) Date of Patent: Mar. 27, 2007

(54) MOBILE COMMUNICATION TERMINAL, SELECTION METHOD FOR DESTINATION OF COMMUNICATION, AND COMPUTER PROGRAM FOR MOBILE COMMUNICATION TERMINAL

(75) Inventor: Masayuki Kushita, Tokyo (JP)

(73) Assignee: NEC Corporation, Tokyo (JP)

( * ) Notice: Subject to any disclaimer, the term of this patent is extended or adjusted under 35 U.S.C. 154(b) by 286 days.

(21) Appl. No.: 10/863,779

(22) Filed: Jun. 9, 2004

(65) Prior Publication Data
US 2004/0252677 A1 Dec. 16, 2004

(30) Foreign Application Priority Data
Jun. 10, 2003 (JP) .............................. 2003-164628

(51) Int. Cl.
*H04M 3/00* (2006.01)
(52) U.S. Cl. ...................... 455/418; 455/415; 455/566; 379/142.05; 379/355.03
(58) Field of Classification Search ................ 455/415, 455/418, 419, 566; 379/142.06, 142.05, 379/216.01, 218.01, 93.24, 100.08, 355.03
See application file for complete search history.

(56) References Cited

U.S. PATENT DOCUMENTS 5,708,804 A  1/1998  Goodwin et al.

| 2002/0001380 | A1 | 1/2002 | Narusawa |
| 2002/0078143 | A1 | 6/2002 | De Boor et al. |
| 2002/0187815 | A1 | 12/2002 | Deeds et al. |
| 2003/0129975 | A1* | 7/2003 | Sim ........................... 455/418 |

FOREIGN PATENT DOCUMENTS

| JP | 10-164210 | 6/1998 |
| JP | 2001-358823 | 12/2001 |
| JP | 2002-244984 | 8/2002 |
| JP | 2003-52071 | 2/2003 |
| WO | WO 99/23805 | 5/1999 |
| WO | WO 02/46957 | 6/2002 |

* cited by examiner

*Primary Examiner*—Jean Gelin
*Assistant Examiner*—Khai Nguyen
(74) *Attorney, Agent, or Firm*—Young & Thompson

(57) ABSTRACT

A mobile telephone (mobile communication terminal) (100) searches data sections (11-1 to 11n) of the address book (10) based on attribute information (ATTm) inputted by a user through an operation unit (207) in order to contact a desired communication counterpart to thereby retrieve identification information (ID, names) associated with the attribute information. Further, the mobile telephone (100) sets a telephone number or an e-mail address, which is associated with the retrieved identification information in the address book (10), as a destination of communication.

11 Claims, 10 Drawing Sheets

MOBILE COMMUNICATION TERMINAL, SELECTION METHOD FOR DESTINATION OF COMMUNICATION, AND COMPUTER PROGRAM FOR MOBILE COMMUNICATION TERMINAL

BACKGROUND OF THE INVENTION

1. Field of the Invention

The present invention relates to a technical field of a mobile communication terminal such as a mobile telephone, and more particularly to a technical field of a mobile communication terminal capable of storing at least one of a destination of communication and a source of communication.

2. Description of the Related Art

Up to now, mobile telephones have come into wide use, with which voice communications can easily be performed even while on the road. In particular, in recent years, the mobile telephones are being put to a wider range of uses not only for voice communications but also as communication terminals for performing send and receive (to be simply referred to as send/receive) of e-mails and data communications.

However, in the case of using such a mobile telephone provided with communication functions to send e-mails with identical contents to a plurality of destination addresses, a user must repeat a designation operation for each of the destination addresses to which the e-mails are to be sent. In addition, depending on the specifications of the mobile telephone, limitations may be imposed on the number of destination addresses that can be designated at a time to a single e-mail with the identical contents.

Thus, a user may find it troublesome to operate a mobile telephone for sending e-mails with identical contents to a plurality of destination addresses.

Further, there is a communication terminal (mobile telephone) having a function of storing incoming e-mails by allocating the e-mails to each corresponding folder. In that case, a user needs to designate, for example, an e-mail address of a source of communication to each folder to which the e-mail is to be stored.

Proposed in JP 2002-244984A is an e-mail management device that eliminates a user's operation for e-mail allocation.

Specifically, the above-mentioned e-mail management device includes storage means for registering and managing e-mail address information and one of group information that defines an incoming e-mail storage area for each group and individual information that defines an incoming e-mail storage area for each individual. The e-mail management device extracts e-mail address information from the source of communication of an incoming e-mail, and compares the extracted e-mail address information with e-mail address information that is previously registered in the storage means. Then, if the comparison results indicate that the information coincides with each other, the e-mail management device stores the incoming e-mail by automatically allocating it to the incoming e-mail storage area that is previously associated with the group information or individual information registered in the storage means.

Proposed in JP 2001-358823 A is a mobile telephone that can store in its memory a plurality of telephone numbers corresponding to a single name and information for discriminating each of the telephone numbers.

Specifically, the above-mentioned mobile telephone includes a memory that stores phonebook data in which a name of an individual is associated with a plurality of telephone numbers corresponding to the name, an operation unit for inputting an instruction, and a control unit for retrieving the phonebook data from the memory based on the instruction. In the mobile telephone, the memory further stores information for discriminating each of the plurality of telephone numbers corresponding to the name. As a result of performing retrieval in response to the instruction to retrieve the phonebook data which has been inputted by the operation unit, the control unit successively displays the telephone numbers and information for discriminating the telephone numbers which are stored in the memory.

Proposed in JP 2003-052071 A is a mobile telephone that is capable of sending e-mails with identical contents (for example, an e-mail for notification of change in e-mail address) to a plurality of destinations with ease.

Specifically, in the case where an e-mail address is changed or other such cases, the above-mentioned mobile telephone collectively sends e-mails with identical contents to all or selected part of a plurality of addresses included in phonebook data stored in a memory and a plurality of addresses included in the data of e-mails that have already been sent/received.

Proposed in JP 10-164210 A is a mobile telephone that can store in its memory a plurality of telephone numbers corresponding to a single name and information for discriminating each of the telephone numbers.

Specifically, in the above-mentioned mobile telephone, a memory stores a plurality of telephone numbers corresponding to a name of an individual as phonebook data. In response to an instruction inputted from an operation part, a control part retrieves the phonebook data from the memory to thereby extract the plurality of telephone numbers stored corresponding to an instructed name, and successively originates a call to the plurality of extracted destinations.

Proposed in JP 2001-117883 A is a technique for exchanging name card information converted in an electronic format between mobile telephones in a wireless communication system such as one using infrared rays.

The conventional mobile telephones have the following problems. That is, there is known a function of recording identification information (including a person's name and a company's name) for specifying a destination of communication in an address book on a basis of a group set by a user. In this case, by searching a group set in a mobile telephone, identification information corresponding to a target destination of communication can be extracted. However, in the case where an identical destination of communication is to belong to a plurality of groups, it becomes necessary to record the identical destination of communication in every group.

Alternatively, there is a mobile telephone having a function of allowing a predetermined number of (for example, up to five) e-mail addresses to be registered as one group address. In such a mobile telephone, when a user selects the group address for a destination address upon sending an e-mail, e-mail addresses for the predetermined number are extracted for the destination address of a single e-mail with identical contents. However, depending on the specifications of the mobile telephone, an operation for registering addresses for the group address needs to be performed separately from a registration operation for an address book. Further, even with such a mobile telephone having a group address function, there is a case where a plurality of group addresses cannot be designated as the destination address upon sending an e-mail.

SUMMARY OF THE INVENTION

The present invention has been made in view of the above-mentioned problems, and therefore has an object to improve operability for a user in a communication function provided to a mobile communication terminal by utilizing identification information for indicating at least one of a destination of communication and a source of communication and plural pieces of attribute information registered in association with information registered for each piece of the identification information.

In order to achieve the above-mentioned object, a mobile communication terminal according to the present invention is characterized by including the following configurations.

Note that reference numerals and symbols within parentheses are added for clarifying correspondences between the descriptions in the appended claims and in the section "detailed description of the preferred embodiments". However, those reference numerals and symbols should not be used for defining the technical scope of the present invention described in the appended claims.

According to the present invention, there is provided a mobile communication terminal for making a telephone call to a telephone number or sending an e-mail to an e-mail address, the telephone number and the e-mail address each being selected by a user as a destination of communication for a desired counterpart from a storage area storing at least one of the telephone number and the e-mail address.

A mobile communication terminal (100) according to the present invention is characterized by comprising:

input means (207) allowing the user to input:
identification information (20) representing a communication counterpart that can be at least one of a destination of communication and a source of communication,
attribute information (ATTm) allowing the user to specify the communication counterpart, and
at least one of the telephone number and the e-mail address as the destination for the communication counterpart;
storage means for storing the identification information, the attribute information, and at least one of the telephone number and the e-mail address, which are inputted through the input means, in the storage area (205) in association with one another; and
communication control means (203, ST1, ST2, and ST4) for, by searching the storage area based on one of the attribute information inputted by the user, retrieving the identification information associated with the inputted attribute information, and setting one of the telephone number and the e-mail address, which is associated with the retrieved identification information, as the destination of communication.

Further, in a preferred embodiment, it is characterized in that:

in addition to the identification information, a first attribute information allowing specification of the communication counterpart, and at least one of the telephone number and the e-mail address as the destination for the communication counterpart, the input means further allows input of a second attribute information (ATTc) allowing the user to specify the destination;

when the second attribute information is inputted through the input means, the storage means stores the second attribute information in the storage area in association with at least one of the telephone number and the e-mail address; and the communication control means includes:
a first retrieval means for, by searching the storage area based on one of the first attribute information inputted by the user, retrieving the identification information associated with the first attribute information;
a second retrieval means for, by searching the storage area based on one of the second attribute information inputted by the user, retrieving at least one of the telephone number and the e-mail address, which is associated with the second attribute information, from a telephone number and an e-mail address which are stored along with the identification information obtained by the first retrieval means; and
communication destination setting means for setting one of the telephone number and the e-mail address, which is retrieved by the second retrieval means, as the destination of communication.

Further, to attain the same object described above, according to another aspect of the present invention, there is provided a mobile communication terminal characterized by including:

input means (207) allowing the user to input:
identification information (20) representing a communication counterpart that can be at least one of a destination of communication and a source of communication,
at least one of the telephone number and the e-mail address as the destination for the communication counterpart, and
attribute information (ATTc) allowing the user to specify the destination;
storage means for storing the identification information, the attribute information, and at least one of the telephone number and the e-mail address, which are inputted through the input function, in the storage area (205) in association with one another; and
communication control means (203, Sa2 to Sa5, and Sb2 to Sb5) for, by searching the storage area based on one of the attribute information inputted by the user, retrieving one of the telephone number and the e-mail address associated with the inputted attribute information, and setting one of the retrieved telephone number and the e-mail address as the destination of communication.

Preferably, in the above structure, when one of the telephone number and the e-mail address is set as the destination of communication, the communication control means:

displays the identification information associated with the attribute information inputted by the user on a display unit (208) (Sa2 and Sa3); and
retrieves one of the telephone number and the e-mail address associated with a specific piece of the identification information selected by the user from the displayed identification information with only the specific piece of the identification information being used as a search target and sets one of the retrieved telephone number and e-mail address as the destination of communication (Sa 4 and Sa5).

Alternatively, in a preferred embodiment, when one of the telephone number and the e-mail address is set as the destination of communication, the communication control means:

Retrieving, by searching the storage area based on a specific piece of identification information representing the communication counterpart inputted by the user, all pieces of the attribute information associated with the specific piece of identification information, displays (Sb3) the retrieved all pieces of the attribute information on a display unit (208), retrieves (Sb4, sb5) one of the telephone number and the e-mail address associated with a specific piece of the attribute information selected by the user from the displayed attribute information with only the selected specific piece of the attribute information being used as a search target, and sets one of the retrieved telephone number and e-mail address as the destination of communication.

Note that the above-mentioned object is also achieved by a selection method for a destination of communication which is used in the mobile communication terminals having the above-mentioned respective configurations.

Further, the above-mentioned object is achieved by the mobile communication terminals having the above-mentioned respective configurations, a software program that causes a computer to execute the selection method for a destination of communication, and a storage medium that stores the software program and can be read by a computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Preferred embodiments of the present invention will now be described in detail in accordance with the accompanying drawings.

Hereinafter, detailed description will be made of embodiments in which the present invention is applied to a mobile telephone, which is a typical example of a mobile communication terminal, with reference to the drawings.

<<First Embodiment>>

Figure 1:
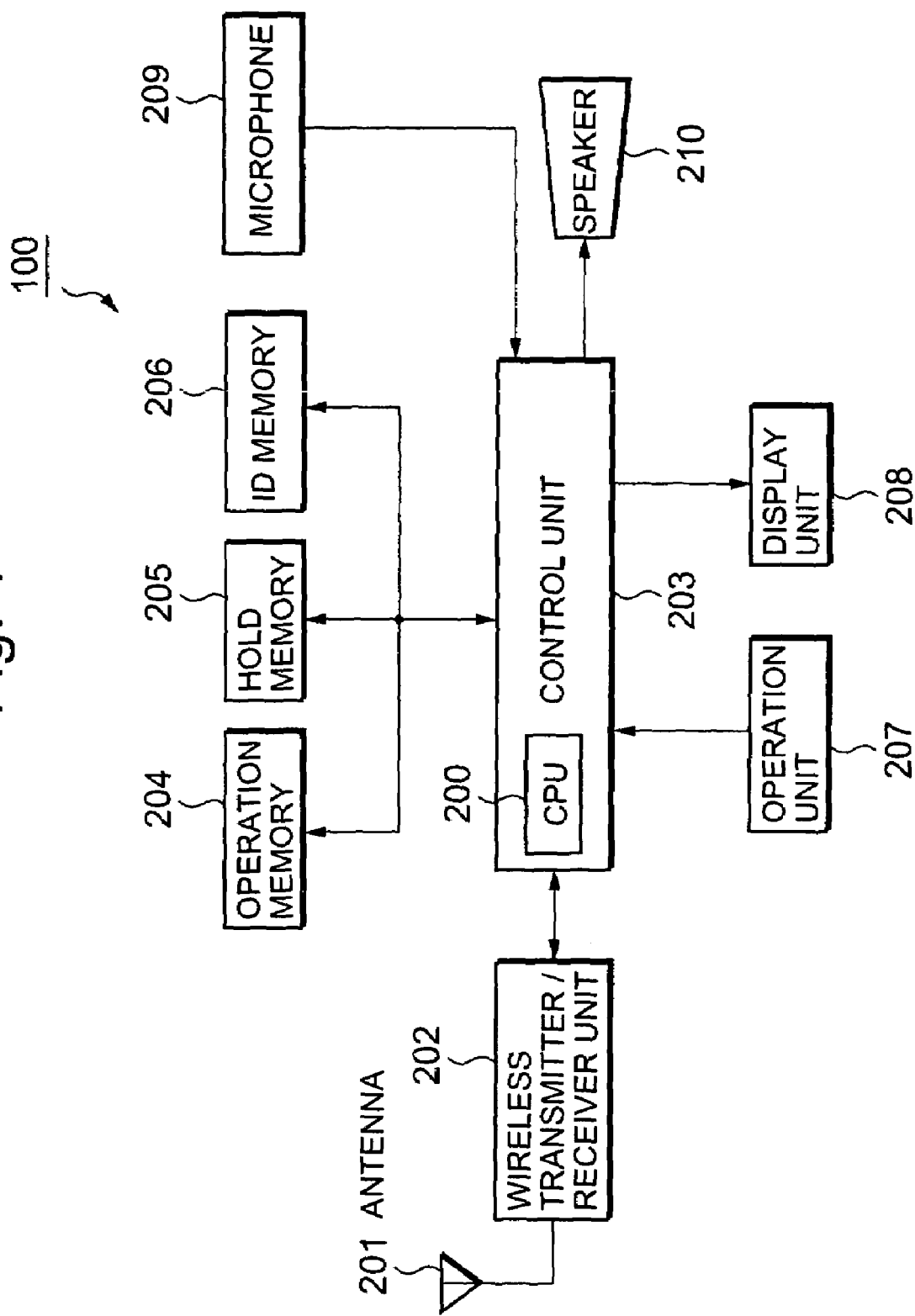
FIG. 1 is a block diagram showing a configuration of a mobile telephone 100 according to a first embodiment of the present invention.

FIG. 1 is a block diagram showing a configuration of a mobile telephone 100 according to a first embodiment of the present invention.

In this embodiment, the mobile telephone (referred to also as "mobile communication terminal" in some cases) 100 includes an antenna 201, a wireless transmitter/receiver unit 202, a control unit 203, an operation memory 204, a hold memory 205, an ID memory 206, an operation unit 207, a display unit 208, a microphone 209, and a speaker 210.

The control unit 203 includes a central processing unit (CPU) 200 for executing a program group stored in the operation memory 204 in advance and hardware (not shown). Thus, the control unit 203 manages operations of respective units of the mobile telephone 100 according to the program group executed by the CPU 200.

More specifically, the CPU 200 of the control unit 203 performs a call alert when detecting a calling number to the mobile telephone 100 from among signals demodulated by the wireless transmitter/receiver unit 202. In addition, the CPU 200 of the control unit 203 performs processing of audio signals and digital data signals, thereby realizing voice communications through the microphone 209 and the speaker 210 and data communications through an e-mail sending/receiving function, a server connection function, etc.

Upon executing the program group stored in the operation memory 204 in advance, the CPU 200 of the control unit 203 further performs search and retrieval on data stored in the operation memory 204, the hold memory 205, and the ID memory 206, and computing processing regarding specified criteria and Boolean expressions entered by a user.

The ID memory 206 holds a calling number (source number) to the mobile telephone 100. In the control unit 203, the CPU 200 uses a calling number (source number) read out of the ID memory 206 for comparison with data corresponding to a predetermined location in the demodulated signals.

The operation memory 204 is used for storing an operation program for the CPU 200 of the control unit 203 and fixed data, and used as a work area during the operation of the CPU 200.

The hold memory 205 holds user data. In this embodiment, the term "user data" includes:

an e-mail received from the outside through the e-mail sending/receiving function;

an e-mail created by a user;

an e-mail that has already sent; and data registered by a user through an address book function.

Note that the operation memory 204, the hold memory 205, and the ID memory 206 may have their portions provided in divided areas of physically the same device.

The operation unit 207 includes a key input unit that allows a user to input information. The operation unit 207 is used for input of a telephone number upon making a call, input of text information upon address book registration, and input of various settings.

The display unit 208 includes a display panel represented by a liquid crystal display. The display unit 208 performs display of a telephone number upon originating/receiving a call, synchronous display of various contents inputted by the operation unit 207, and display of the text of e-mail contents received through the e-mail sending/receiving function.

The antenna 201 allows transmission/reception of a radio wave whose phase is modulated, and in addition, has the same function as an antenna of a known wireless communication terminal.

The wireless transmitter/receiver unit 202 performs demodulation of the radio wave received from the antenna 201, and phase modulation on a digital signal outputted from the control unit 203. Also, the wireless transmitter/receiver unit 202 has the same function as a wireless transmitter/receiver unit of a known wireless communication terminal.

A voice of a user is inputted to the microphone 209. The speaker 210 outputs a voice (sound) toward a user.

Note that at present, general techniques may be adopted for operations, which are executed by the mobile telephone 100 having the above-mentioned device configuration with respect to an external device, including a data sending/receiving processing and a voice processing. Accordingly, detailed description thereof is omitted in this embodiment.

Next, description will be made of a characteristic configuration of the mobile telephone 100 according to this embodiment with reference to FIGS. 2 to 4.

Figure 2:
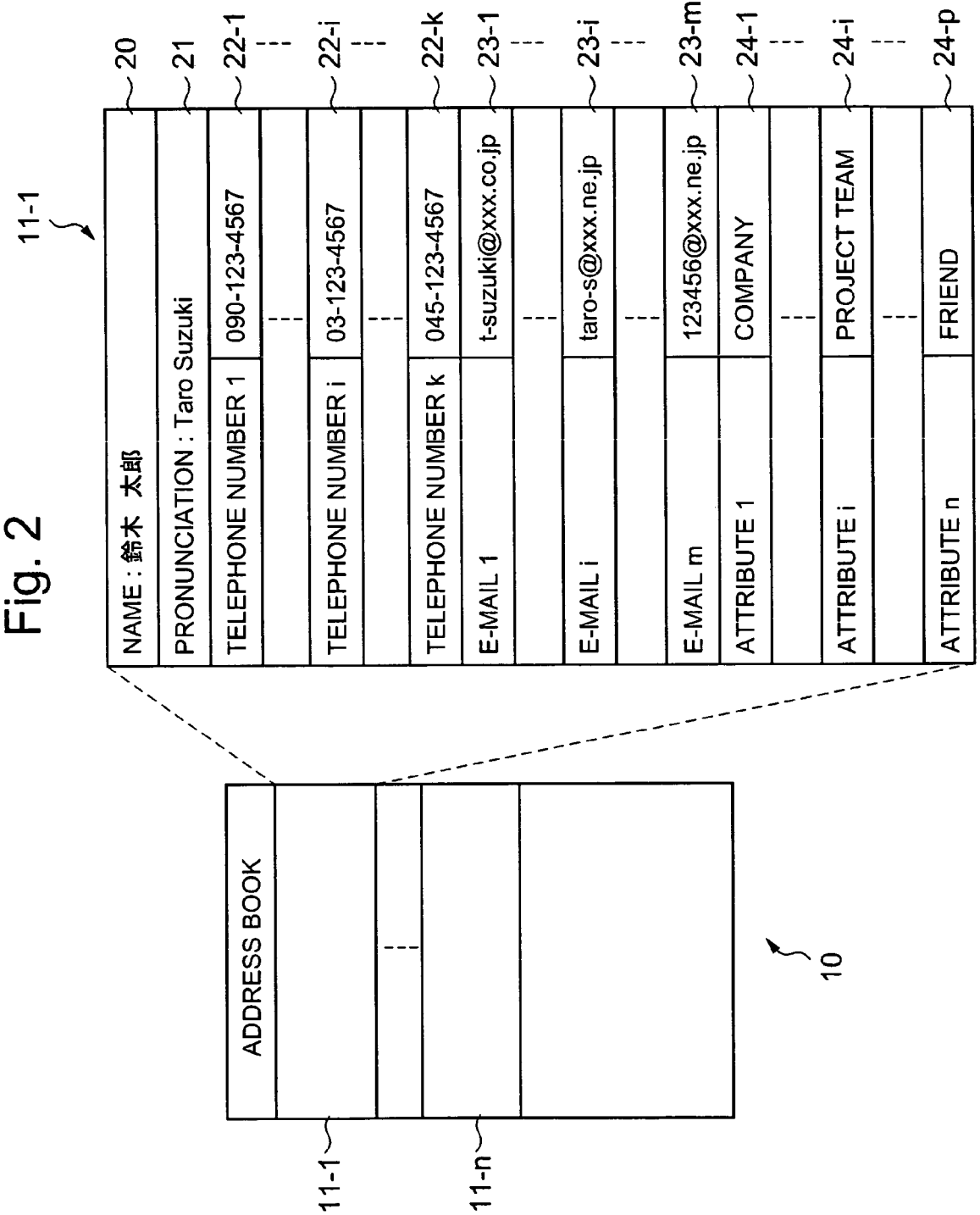
FIG. 2 shows an example of a storage area structure of an address book 10 stored in a hold memory 205 according to the first embodiment.

FIG. 2 shows an example of a storage area structure of an address book 10 stored in a hold memory 205 according to the first embodiment.

According to this embodiment, a user can register a destination of an acquaintance or the like in the mobile telephone 100 along with attribute information ATTm, which will be described later, by operating the operation unit 207 during execution of the address book function. The address book function is provided to a user when the CPU 200 executes a software program for realizing the address book function.

Herein, the term "destination" represents destination information including a telephone number used for making a call and an e-mail address for sending an e-mail (the same applies hereinafter).

The CPU 200 dedicates a predetermined storage area (within a memory space) of the hold memory 205 to the address book 10 that is conceptually illustrated in FIG. 2. In other words, the address book 10 is a storage area in which user data is registered through the address book function.

In the address book 10, it is possible to record, for each piece of identification information (ID), a plurality of telephone numbers, a plurality of e-mail addressees, and a plurality of attributes (hereinafter, referred to as "attribute information ATTm").

In this embodiment, the identification information ID represents identification information for specifying a counterpart (including a person's name and a company's name) that can be either of a destination of communication and a source of communication. Hereinafter, such a counterpart will be referred to as "communication counterpart". In the example shown in FIG. 2, the identification information ID is a person's name "鈴木太郎 (Taro Suzuki)" registered in a name field 20.

In each of data sections 11-1 to 11-n (where n is an integer of 2 or greater, and an arbitrary number between 1 and n may be denoted by i; the same applies hereinafter) provided on an identification information ID basis, it is possible to record a plurality of telephone numbers, a plurality of e-mail addressees, and plural pieces of attribute information ATTm.

Note that the address book 10 is not limited to the form shown in FIG. 2 as far as it is possible to record plural pieces of attribute information ATTm for each piece of identification information ID.

The data sections 11-1 to 11-n corresponding to respective pieces of identification information ID within the address book 10 each include:

the name field 20 where a piece of identification information ID is recorded;

a pronunciation field 21;

telephone number fields 22-1 to 22-k (where k is an integer of 2 or greater, and an arbitrary number between 1 and k may be denoted by i; the same applies hereinafter);

e-mail address fields 23-1 to 23-m (where m is an integer of 2 or greater, and an arbitrary number between 1 and m may be denoted by i; the same applies hereinafter); and attribute fields 24-1 to 24-p (where p is an integer of 2 or greater, and an arbitrary number between 1 and p may be denoted by i; the same applies hereinafter) where attribute information ATTm is recorded.

Recorded in the name field 20 is a name of a person or company registered as a communication counterpart.

Recorded in the pronunciation field 21 is a pronunciation of the name recorded in the name field 20. The pronunciation field 21 may be referenced when, for example, the CPU 200 determines a display order of the data sections 11-1 to 11-n within the address book 10.

Recorded in each of the telephone number fields 22-1 to 22-k is a telephone number for originating a call or the like in order to make a telephone call to a communication counterpart registered in the name field 20. There are cases where a plurality of telephone numbers (for example, "home", "parents' home", "mobile telephone", "company", etc.) are to be registered for one communication counterpart (one piece of identification information ID). Therefore, a plurality of telephone number fields 22-1 to 22-k are preferably provided as the specifications of the mobile telephone 100.

Recorded in each of the e-mail address fields 23-1 to 23-m is an e-mail address for sending an e-mail to a communication counterpart registered in the name field 20. There are cases where a plurality of e-mail addresses (for example, "home PC address", "mobile telephone address", "company address", etc.) are to be registered for one communication counterpart (one piece of identification information ID). Therefore, a plurality of e-mail address fields 23-1 to 23-m are preferably provided as the specifications of the mobile telephone 100.

Note that in this embodiment, for suitable operation of the mobile telephone 100, at least one telephone number has only to be registered in the telephone number fields 22-1 to 22-k, or at least one e-mail address has only to be registered in the e-mail address fields 23-1 to 23-m.

Recorded in each of the attribute fields 24-1 to 24-p is a piece of attribute information ATTm of the communication counterpart. In this embodiment, one piece of identification information ID within the address book 10 can be registered in association with at least one piece of attribute information ATTm serving as information allowing a user to easily specify (recognize) a communication counterpart that can be either of a destination of communication and a source of communication corresponding to the identification information ID.

More specifically, the attribute information ATTm includes characteristic strings such as "company relating", "project team", "design Gr.", "inside department", "client", "partner company", "private", "friend", "alumni", "neighborhood association", "club activity", and "family/relative". In an "attribute setting mode" to which a mode transition can be made during the execution of the address book function, a user can freely set the attribute information ATTm by operating the operation unit 207. Note that a concept of the attribute information ATTm is described later with reference to FIG. 3.

There are cases where plural pieces of attribute information ATTm are to be registered for one name (one piece of identification information ID). Therefore, a plurality of attribute fields 24-1 to 24-p are preferably provided as the specifications of the mobile telephone 100.

Note that a user may register at least one group of telephone numbers and e-mail addresses as necessary. Also, the user may register at least one of the telephone numbers and at least one of the e-mail addresses as necessary.

Herein, in a "communication counterpart registration mode" to which a mode transition can be made during the execution of the address book function, a user performs an operation for registering a communication counterpart or the like for the address book 10 by operating the operation unit 207 while referencing a display screen of the display unit 208. Possible examples of the form of the display screen displayed on the display unit 208 at this time include a fixed format similar to the data section 11-1 exemplified in FIG. 2. According to a predetermined operation performed by the user through the operation unit 207, the CPU 200 registers, in the hold memory 205, each piece of information entered in the name field 20 and the telephone number fields 22-1 to 22-k in association with the attribute information ATTm entered in the attribute fields 24-1 to 24-p.

Further, there are cases where an attribute, which reminds a user conceptually of a certain communication counterpart, contains another attribute or a given attribute partially contains another attribute. Relationships among attributes in such cases are described below.

Figure 3:
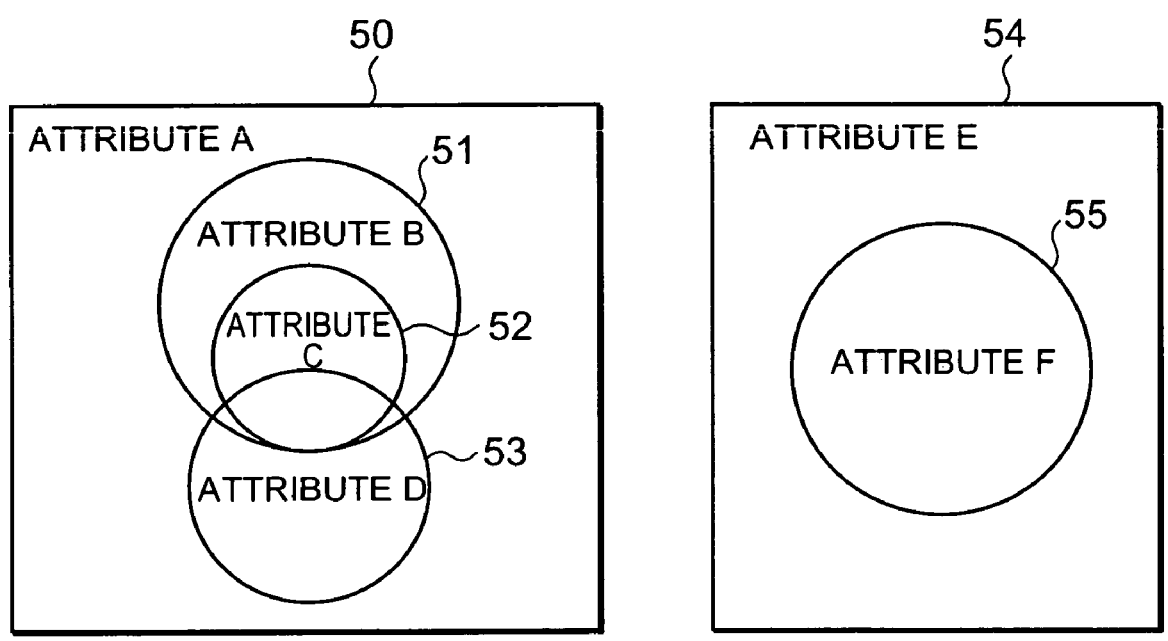
FIG. 3 is a conceptual diagram for explaining relationships among attributes (attribute information ATTm) according to the first embodiment.

FIG. 3 is a conceptual diagram for explaining the relationships among attributes (attribute information ATTm) according to the first embodiment. In the drawing, for example, an attribute A 50 represents "company relating", an attribute B 51 "project team", an attribute C 52 "design Gr.", an attribute D 53 "inside department", an attribute E 54 "private", and an attribute F 55 "friend".

The attribute A 50 contains the attribute B 51, the attribute C 52, and the attribute D 53. Further, the attribute B 51 contains the attribute C 52, and partially contains the attribute D 53.

Alternatively, although not shown, there is a possible case of belonging both to "company relating" of the attribute A 50 and to "friend" of the attribute F 55. Specific examples thereof include a coworker employed by the same company in the same year and a dormitory mate. Possible examples of a candidate who is assigned with only the attribute E 54 include an acquaintance, a family member, and a relative.

As described above, there are cases where a plurality of attributes (that is, plural pieces of attribute information ATTm) are to be associated with one communication counterpart (one piece of identification information ID). In such cases, in the above-mentioned "attribute setting mode", a user of the mobile telephone 100 can arbitrarily set a state of overlaps and sets (that is, containment relationships) among those attributes.

As specific setting operations for such cases, the user may perform, for example, the following input operations through the operation unit 207.

That is:

an input operation of "(attribute X)=>(attribute Y)" if "attribute X" contains "attribute Y";

an input operation of "(attribute X)=≠(attribute Y)" if "attribute X" does not contain "attribute Y";

an input operation of "(attribute X)=(attribute Y)×(attribute Z)" if "attribute X" is an overlap between "attribute Y" and "attribute Z"; and an input operation of "(attribute X)=(attribute Y)+(attribute Z)" if "attribute X" is "attribute Y" or "attribute Z"; may be performed.

The mobile telephone 100 according to the first embodiment utilizes the structure of the address book 10 and the registered attribute information ATTm, thereby improving convenience of an e-mail sending operation.

More specifically, in this embodiment, the mobile telephone (mobile communication terminal) 100 can make a mode transition to a "communication counterpart selection mode" in a state where communication counterparts are registered in the address book 10 as shown in the example of FIG. 2. When a desired attribute is designated by a user in the "communication counterpart selection mode", the CPU 200 retrieves a communication counterpart (identification information ID) associated with the attribute (attribute information ATTm) from the address book 10. In other words, the desired attribute designated by a user is used as a search key for a retrieval processing performed as described above. Note that the desired attribute designated by a user needs to be any of the attributes (attribute information ATTm) set in advance in the "attribute setting mode".

In the case of retrieving a plurality of communication counterparts in the retrieval processing, the CPU 200 of the mobile telephone 100 can send e-mails with identical contents at a time to e-mail addresses registered in the data sections 11-1 to 11-n corresponding to the respective retrieved communication counterparts.

However, in conventional e-mail services utilizing mobile telephones, limitations may be imposed on the number of destination addresses to which the e-mails with identical contents can be sent at a time in consideration of every circumstance (for example, spam e-mails for the purpose of an advertisement or a prank).

Therefore, in the e-mail sending processing (FIG. 4) described below, the mobile telephone 100 according to the first embodiment is made ready for the cases where limitations are imposed on the number of destination addresses.

Figure 4:
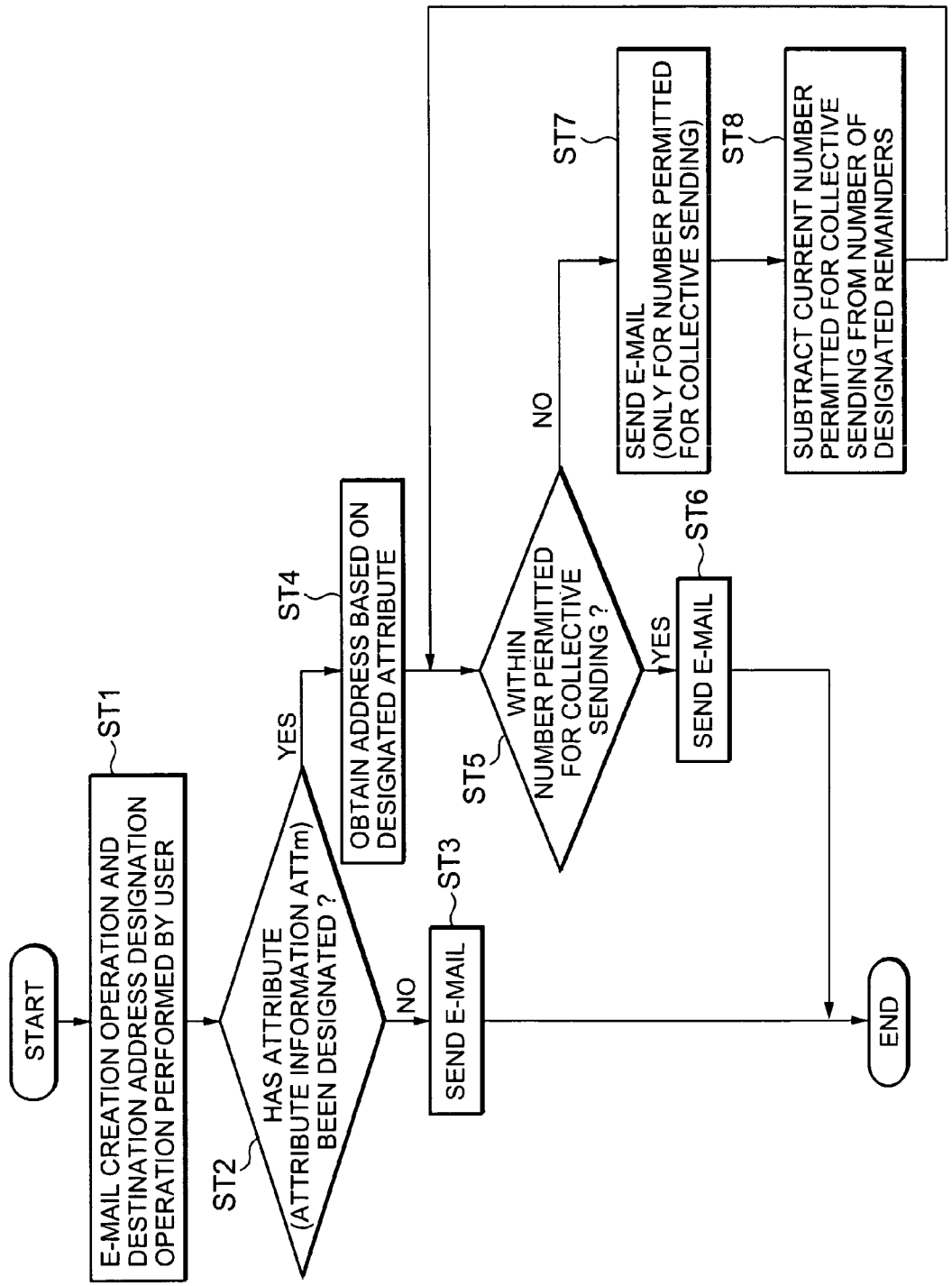
FIG. 4 is a flow chart of an e-mail sending processing performed on the mobile telephone 100 according to the first embodiment.

FIG. 4 is a flow chart of the e-mail sending processing performed on the mobile telephone 100 according to the first embodiment. The flow chart shows a processing procedure of a software program executed by the CPU 200 of the control unit 203 shown in FIG. 1.

In a state where the registration for the address book 10 is made in advance in the above-mentioned "attribute setting mode" and "communication counterpart registration mode" as shown in FIG. 2, a user first uses the mobile telephone 100 to perform a creation operation for a body (contents) of an e-mail to be sent and a designation operation for a destination address to which the user wishes to send the e-mail (step ST1). In the case where the user wishes to send e-mails with identical contents to a plurality of communication counterparts (destination addresses) upon the designation operation for a destination address of step ST1, an attribute set in advance in the address book 10 can be designated in the above-mentioned "communication counterpart selection mode".

In the control unit 203, the CPU 200 then judges whether or not an attribute has been designated (step ST2).

If the judgment of step ST2 shows that there is no designated attribute and if the number of e-mail addresses of destination of communication is within a predetermined number N, the CPU 200 sends an e-mail through the wireless transmitter/receiver unit 202 to the destination address that is designated by the user's input operation for a name or an e-mail address in step ST1 (step ST3).

Note that at present, a general procedure may be adopted for the e-mail sending processing performed after the destination of communication is specified in step ST3. Accordingly, detailed description thereof is omitted in this embodiment.

On the other hand, if a designated attribute is detected in step ST2, the CPU 200 of the control unit 203 executes a processing of step ST4. That is, the CPU 200 searches the data sections 11-1 to 11-n of the address book 10 in step ST4. As a result of the search, the CPU 200 retrieves a name 20 (identification information ID) associated with the same attribute information ATTm (in the attribute fields 24-1 to 24-p) as the attribute designated by the user in step ST1.

In step ST4, the CPU 200 further retrieves an e-mail address associated with the retrieved name 20.

Here, there is a case where a plurality of e-mail addresses are registered in association with one name 20 that is associated with the same attribute information ATTm as the designated attribute as shown in FIG. 2. In such a case, in step ST4, the CPU 200 retrieves an e-mail address registered in the first field (in the e-mail address field 23-1) as the destination of communication with the highest priority. Alternatively, the adopted configuration may allow a user to select, or register in advance, which of a plurality of registered e-mail addresses is to be retrieved as the destination of communication.

In the control unit 203, the CPU 200 then judges whether or not the number of e-mail addresses retrieved in step ST4 is within a predetermined number N permitted for e-mails to be sent at a time (step ST5).

If the judgment of step ST5 shows that the number of e-mail addresses as sending targets is within the predetermined number N permitted for e-mails to be sent at a time, the CPU 200 sends e-mails with identical contents through the wireless transmitter/receiver unit 202 to all the e-mail addresses as the sending targets (step ST6).

Note that at present, a general procedure may be adopted for the e-mail sending processing performed after the destination of communication is specified in step ST6. Accordingly, detailed description thereof is omitted in this embodiment.

On the other hand, if the judgment of step ST5 shows that the number of e-mail addresses as sending targets exceeds the predetermined number N permitted for e-mails to be sent at a time, the CPU 200 executes steps ST7 and ST8 as follows.

The CPU 200 first sends e-mails through the wireless transmitter/receiver unit 202 to the predetermined number N of e-mail addresses from among all the e-mail addresses retrieved in step ST4 (step ST7).

Note that at present, a general procedure may be adopted for the e-mail sending processing performed after the destination of communication is specified in step ST7. Accordingly, detailed description thereof is omitted in this embodiment.

Subsequently, the CPU 200 of the control unit 203 excludes the e-mail addresses that have been sent by the processing of step ST7 from the sending targets (step ST8). Then, the CPU 200 sets the e-mail addresses remaining as the sending targets to new sending targets to be processed, and repeats the processings of steps ST5 to ST8. If the number of e-mail addresses as sending targets becomes equal to or less than the predetermined number N permitted for e-mails to be sent at a time after repeating a series of the above-mentioned processings, the CPU 200 performs the last sending processing to the e-mail addresses whose number is N or less (step ST6).

As described above, according to the first embodiment, the CPU 200 executes the above-mentioned e-mail sending processing, thereby realizing the processing for sending e-mails with identical contents to at least one target communication counterpart associated with a given attribute (attribute information ATTm). The e-mail sending processing further realizes readiness for the cases where the number of destination addresses of the e-mails with identical contents to be sent at a time is limited to a predetermined number under the constraints of the system.

In other words, by using the mobile telephone 100 according to the first embodiment, a user does not need to individually set specific names or e-mail addresses of a plurality of destinations of communication in the case of sending the e-mails with identical contents to a plurality of communication counterparts. Accordingly, the operability is further improved for a user.

(Modification of the First Embodiment)

In this modification of the first embodiment, when a user designates an attribute in step ST1 described above, a plurality of attributes can be designated through the operation of the operation unit 207. In this case, designation of a logical operator (for an AND (logical product) condition, an OR (logical sum) condition, a NOT (logical NOT) condition, or the like) is performed on the plurality of attributes designated in step ST1. Such a designation operation may be performed by inputting text information representing the logical operator such as "AND", "OR", or "NOT" or by inputting a predetermined symbol (such as ×, +, or ≠). By such a configuration as to allow the above-mentioned designation operation to be set in step ST1, the mobile telephone 100 enhances its operability in the case of sending e-mails with identical contents to a plurality of destinations of communication.

Hereinafter, description will be made of a specific example of designation of the plurality of attributes by use of the logical operator as described above. Consideration will be made of an example case where the attribute B and the attribute D represent "project team" and "inside department", respectively, in the example of FIG. 3. In this case, the user designates the attribute B and the attribute D under the AND condition in step ST1, so that the CPU 200 sends e-mails with identical contents only to the "project team" members "inside department" concerned.

Consideration will be made of an alternative example case where the attribute A and the attribute E represent "company relating" and "private", respectively. In this case, the user designates the attribute A and the attribute E under the OR condition in step ST1, so that the CPU 200 sends e-mails with identical contents to all the "company relating" counterparts or to all the counterparts corresponding to "private".

<<Second Embodiment>>

Next, description will be mainly made of a second embodiment whose basis is on the mobile telephone 100 according to the first embodiment.

Hereinafter, description will be mainly made of characteristic part of this embodiment, and the overlapping description of the same configuration as that of the first embodiment will be omitted.

In this embodiment, the following functions are added to the mobile telephone 100 of the first embodiment. That is, in the above-described first embodiment, the description has been made of the mobile telephone 100 having characteristics in the processing for sending e-mails with identical contents to a plurality of destination addresses, while in the second embodiment, description will be made of the mobile telephone 100 having the above configuration along with characteristics in a processing of receiving an e-mail from the outside.

According to this embodiment, if the single attribute A completely contains the other attribute D, for example, in the relationships among attributes shown in FIG. 3, the CPU 200 associates the attribute D with the attribute A when a user designates the attribute D. More specifically, the attribute D representing "inside department" is always associated with the attribute A representing "company relating".

Figure 5:
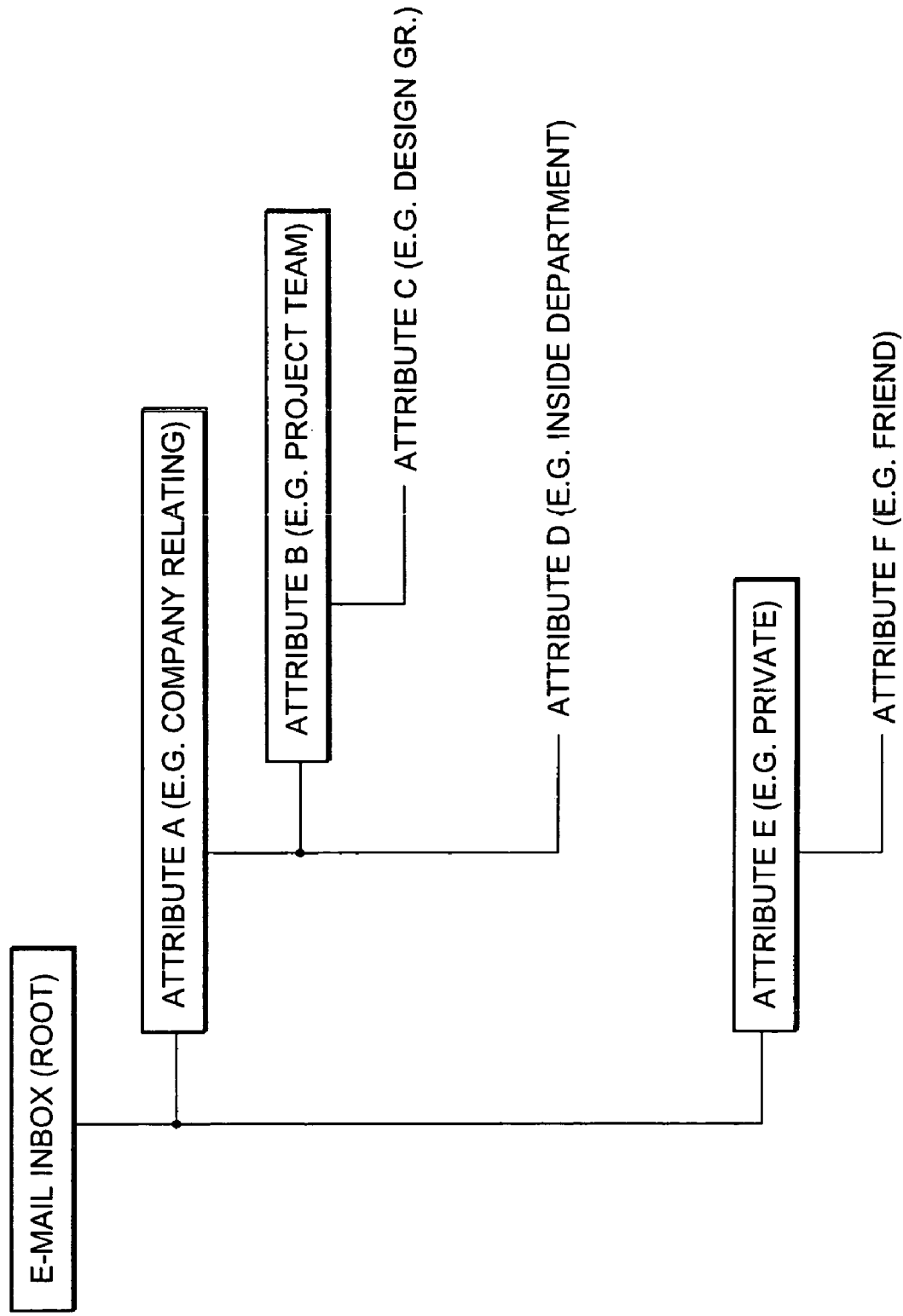
FIG. 5 is a diagram in which the relationships among the attributes exemplified in FIG. 3 are expressed in the form of a folder structure of an e-mail inbox according to a second embodiment.

Hereinafter, description will be made of a specific configuration that realizes the above-mentioned associating operation. FIG. 5 is a diagram in which the relationships among the attributes exemplified in FIG. 3 are expressed in the form of a folder structure (directory structure) of an e-mail inbox according to the second embodiment. In this embodiment, the term "folder" represents a storage area for categorizing and storing at least incoming e-mails. The storage area is allocated within the hold memory 205 of the mobile telephone 100. Each folder, functioning as a man-machine interface, can be visually recognized by a user on the display unit 208 and can be operated through the operation unit 207.

As shown in FIG. 5, folders of an e-mail inbox are created for each attribute and each hierarchical level. An incoming e-mail received by the mobile telephone 100 is stored in the e-mail inbox allocated within the hold memory 205. Each characteristic string enclosed in a square shown in FIG. 5 represents a folder. The hierarchical structure of the folders is determined by the CPU 200 based on the containment relationships among attributes set by a user. A setting operation for the hierarchical structure of the folders is performed by a user through the operation unit 207 after the setting operation in the "attribute setting mode" is performed as described above.

Figure 6:
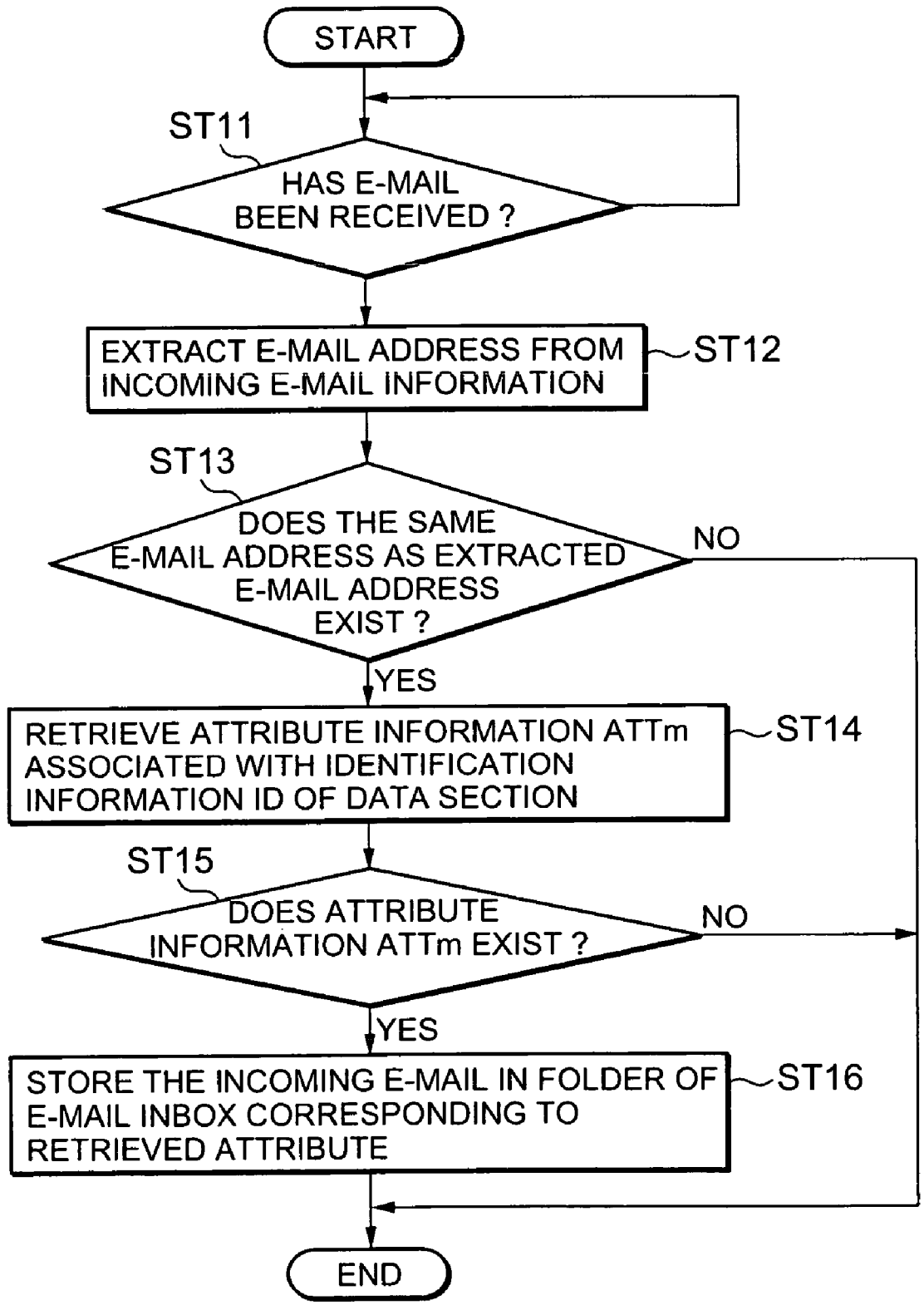
FIG. 6 is a flow chart of an e-mail receiving processing performed on the mobile telephone 100 according to the second embodiment.

FIG. 6 is a flowchart of an e-mail receiving processing performed on the mobile telephone 100 according to the second embodiment. This flow chart shows a processing procedure of a software program executed by the CPU 200 of the control unit 203 shown in FIG. 1.

In the drawing, upon receiving an e-mail (step ST11), the CPU 200 of the control unit 203 extracts an e-mail address of the incoming e-mail (step ST12).

Then, the CPU 200 judges whether or not the same e-mail address as the extracted e-mail address exists in any of the data sections 11-1 to 11-n that are already registered in the address book 10 (step ST13).

If the judgment of step ST12 shows that the same e-mail address exists, the CPU 200 retrieves attribute information ATTm associated with identification information ID (in the name field 20) of the one of the data sections 11-1 to 11-n in which the e-mail address is registered (step ST14).

If the attribute information ATTm can be retrieved in step ST14 (step ST15), the CPU 200 stores the incoming e-mail in a folder of the e-mail inbox corresponding to the retrieved attribute (step ST16).

In other words, in this embodiment, the e-mail inbox having a folder structure corresponding to the containment relationships and embedded relationships among attributes is allocated within the hold memory 205. The CPU 200 automatically allocates an incoming e-mail to a storage destination based on the attribute corresponding to a source address of the incoming e-mail.

According to the above embodiment, it becomes easy to organize and retrieve incoming e-mails. Therefore, in addition to the convenience described in the first embodiment, the convenience is further improved for a user. More specifically, in addition to a business-related folder and a private folder, the user can freely create folders based on the attributes registered in the address book 10 in advance. Accordingly, such a folder structure desired by the user is allocated within the hold memory 205, so that an incoming e-mail is automatically allocated to and recorded in a folder optimum for the user.

Note that there are cases where plural pieces of attribute information ATTm are registered in one of the data sections 11-1 to 11-n corresponding to a given name in the name field 20 (identification information ID). In such cases, priorities are put to respective attributes in advance so that an incoming e-mail from the e-mail address associated with the name is stored in a folder corresponding to an attribute with a higher priority.

Alternatively, another configuration may be adopted for the above cases, in which the entity of a data file of the incoming e-mail is stored only in a folder corresponding to a given single attribute and its shortcuts are placed in folders corresponding to other attributes, so that the data file of the incoming e-mail can be accessed via a plurality of paths.

Note that another device configuration may be assumed, in which the e-mail inbox according to this embodiment is replaced with an e-mail outbox for storing e-mails to be sent and the e-mail address of a source of communication is replaced with an e-mail address of a destination of communication. According to such a device configuration, attribute information can be utilized for storing outgoing e-mails similarly to this embodiment dedicated to the incoming e-mails.

<<Third Embodiment>>

Next, description will be mainly made of a third embodiment whose basis is on the mobile telephone 100 of the first embodiment.

Hereinafter, the description will be mainly made of characteristic part of this embodiment, and the overlapping description of the same configuration as that of the first embodiment will be omitted.

In recent years, there is established a technique for exchanging name card information (profile information) converted in an electronic format between mobile telephones in a wireless communication system such as one using infrared rays. In this embodiment, this technique is utilized to realize simple maintenance of registration information within the address book 10 which is performed between a plurality of mobile telephones 101.

Figure 7:
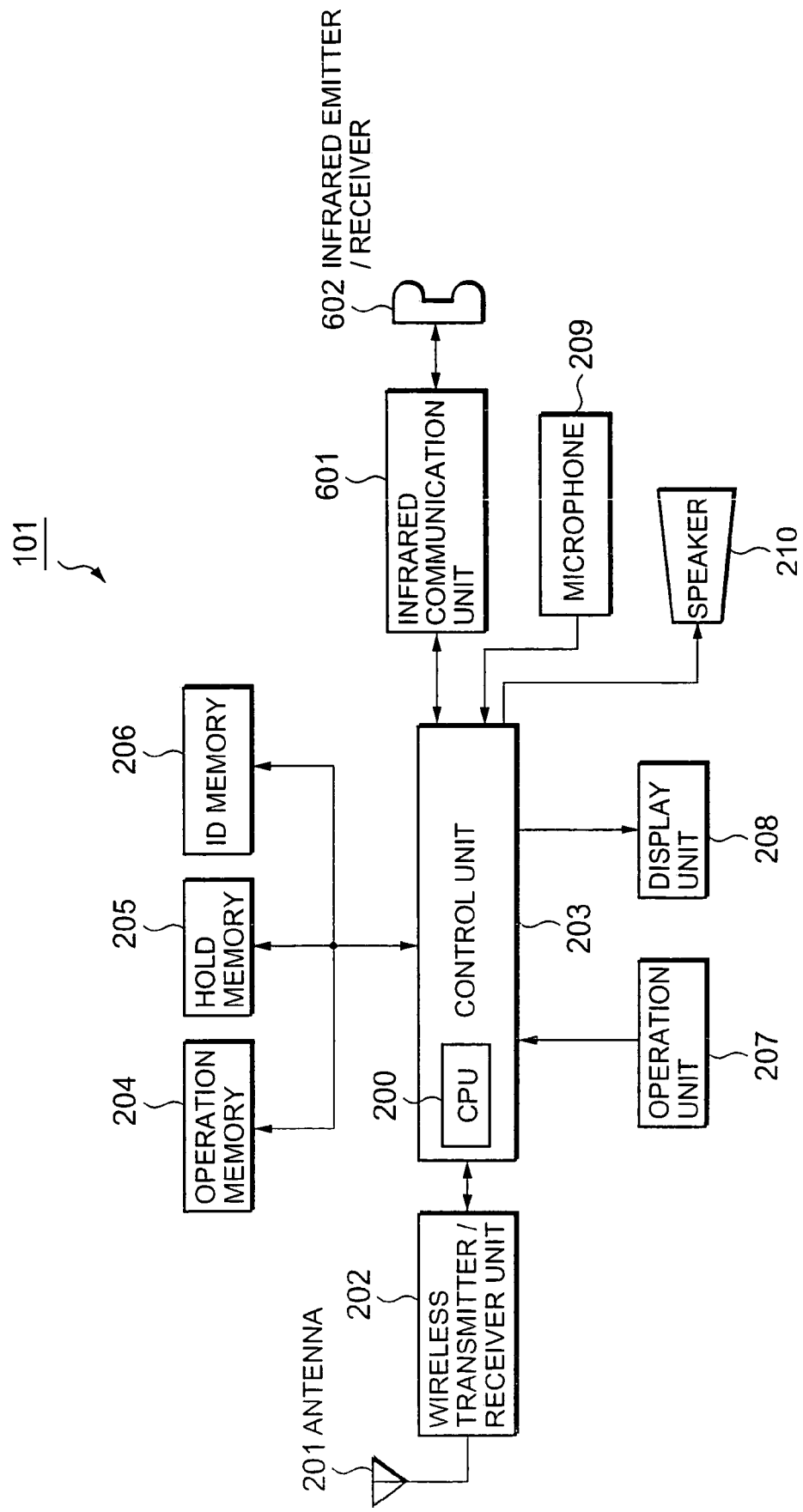
FIG. 7 is a block diagram showing a configuration of a mobile telephone 101 according to a third embodiment of the present invention.

FIG. 7 is a block diagram showing a configuration of the mobile telephone 101 according to the third embodiment of the present invention. The mobile telephone 101 according to the third embodiment of the present invention includes the same structural components as those of the mobile telephone (mobile communication terminal) 100 as described above in FIG. 1, and further includes an infrared communication unit 601 and an infrared emitter/receiver 602.

The infrared communication unit 601 modulates/demodulates a digital signal in infrared communications. The infrared communication unit 601 performs start-stop synchronization in serial communications with the control unit 203. The infrared communication unit 601 sends/receives a demodulated signal to/from the infrared emitter/receiver 602.

The infrared emitter/receiver 602 performs transmission/reception of infrared rays to/from another terminal and conversion between an electrical signal and a light signal.

In the mobile telephone 101 according to this embodiment, the address book function is used, so that user's own profile information can be registered as one of the data sections 11-1 to 11-n described above with reference to FIG. 2.

In such a device configuration as described above, the mobile telephone 101 exchanges the user's own profile information with another terminal having the same device configuration as that of the mobile telephone 101. Accordingly, the mobile telephone 101 can record profile information received from the counterpart in one of the data sections 11-1 to 11-n of the address book 10 of the user's own terminal. Note that the profile information includes at least respective information items (that is, a name, a telephone number, an e-mail address, and attribute information ATTm) composing one of the data sections 11-1 to 11-n described above with reference to FIG. 2.

More specifically, the CPU 200 of the control unit 203 records other party's profile information, which is obtained by performing a profile exchange through infrared communications, in one of the data sections 11-1 to 11-n within the address book 10 of a user's own device as a new record. At this time, the CPU 200 stores, in one of the attribute fields 24-1 to 24-p of one of the data sections 11-1 to 11-n, a predetermined attribute information indicating that the record is data obtained from another terminal by performing the profile exchange. In the mobile telephone 101, the attribute information stored in one of the attribute fields 24-1 to 24-p here is recognized as one piece of attribute information ATTm described in the first embodiment.

In other words, in the case of obtaining information from an external device through a profile exchange, a predetermined attribute based on which the CPU 200 can judge that the information is the profile information obtained through a profile exchange is registered in any one of the attribute fields 24-1 to 24-p of one of the data sections 11-1 to 11-n in which the information is to be stored. In this embodiment, the predetermined attribute information is used as one of the plural pieces of attribute information ATTm.

In the case where the user's own profile information is updated in the user's own terminal, the mobile telephone 101 having such a profile exchange function provides the updated profile information to another terminal (another mobile telephone 101) with which the profile exchange has been performed before through infrared communications.

More specifically, in the mobile telephone 101 in which the user's profile information has been updated, the CPU 200 searches the attribute fields 24-1 to 24-p of the respective data sections 11-1 to 11-n by using as a search key the predetermined attribute information indicating that a record is data obtained before from another terminal by performing a profile exchange.

If the desired attribute information ATTm can be retrieved by the retrieval processing, the CPU 200 of the mobile telephone 101 automatically retrieves an e-mail address included in a specific data section 11-n in which the attribute information ATTm is registered. In other words, in the specific data section 11-n, the attribute information ATTm indicating that a profile exchange has been performed before is associated with identification information ID (the name of a communication counterpart stored in the name field 20) of the data section 11-n similarly to the first embodiment. Also registered in the data section 11-n is an e-mail address with which the communication counterpart represented by the identification information ID can be contacted by e-mail communications. Accordingly, the CPU 200 reads the e-mail address out of the data section 11-n.

Then, the mobile telephone 101 sends an e-mail notifying that the profile information has been updated to the communication counterpart's e-mail address retrieved as described above automatically or based on the operation by a user. Upon sending the e-mail, the CPU 200 attaches the updated user's profile information to the e-mail.

Note that in order to improve the convenience for a user, it is preferable that the e-mail be created in a predetermined format and sent, automatically.

Next, description will be made of an operation of the mobile telephone 101 as the other terminal that receives the above e-mail attached with the updated profile information.

That is, in the case of receiving the e-mail, the CPU 200 of the control unit 203 replaces profile information that is already recorded in a specific data section 11-n within the address book 10 of the other terminal with the updated profile information attached to the e-mail. In this case, the CPU 200 can easily judge the correspondence between the profile information stored in the specific data section 11-n and the received updated profile information by comparing the e-mail addresses (in the e-mail address fields 23-1 to 23-m), the name (in the name field 20), and the attribute information ATTm indicating that a profile exchange has been performed before.

According to the mobile telephone 101 of the third embodiment described above, an operation for sending a notification (for example, a personnel change notice or a change-of-address notice), which takes a user much time and labor, can be automatically performed if the profile exchange is performed in advance. Thus, the mobile telephone 101 further enhances its convenience.

<<Fourth Embodiment>>

Next, description will be mainly made of a fourth embodiment whose basis is on the mobile telephone 100 according to the first embodiment.

Hereinafter, the description will be mainly made of characteristic part of this embodiment, and the overlapping description of the same configuration as that of the first embodiment will be omitted.

Note that the device configuration of a mobile telephone according to this embodiment is the same as the device configuration of the mobile telephone 100 shown in FIG. 1 (which may be the mobile telephone 101).

Figure 8:
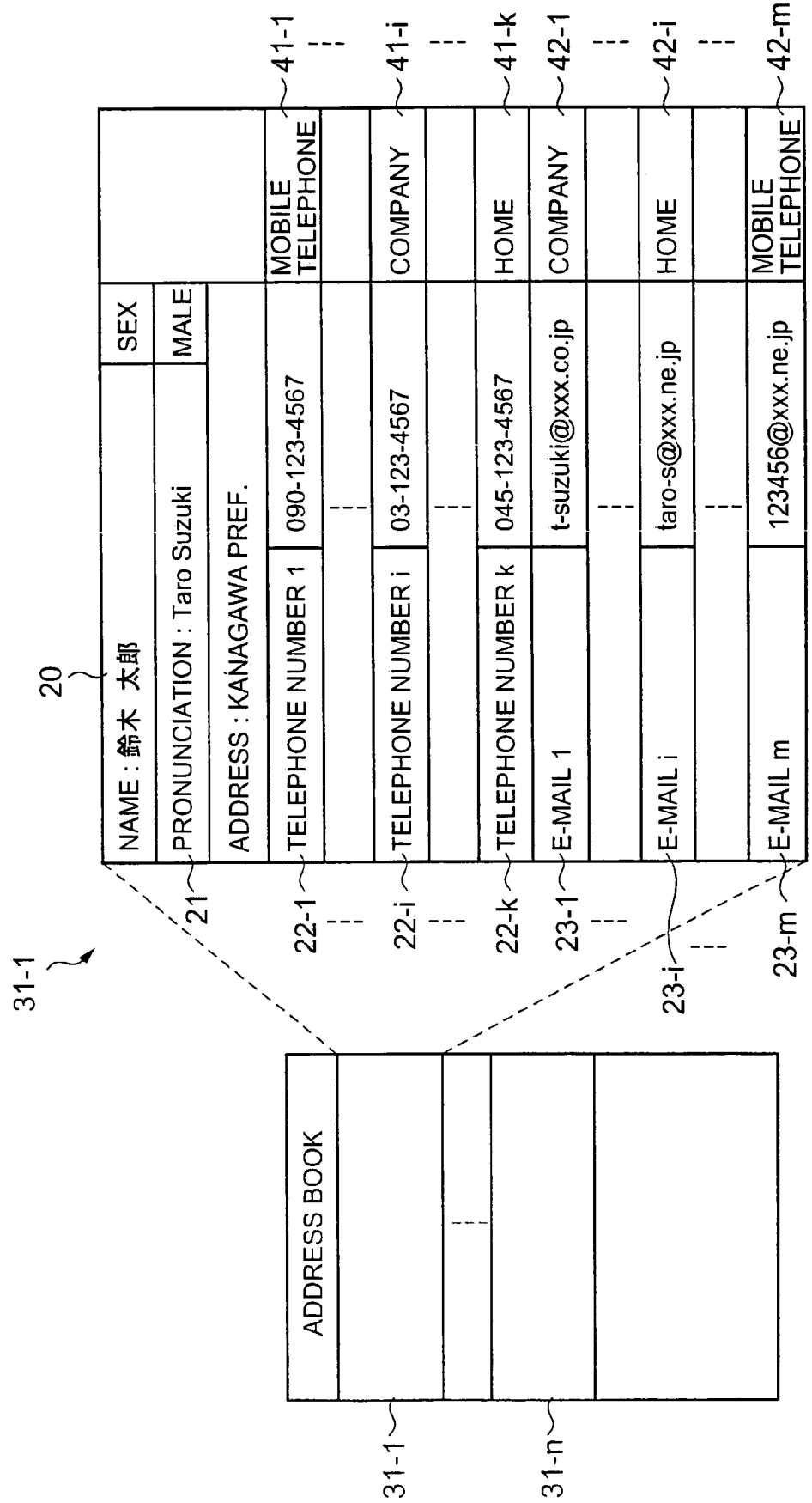
FIG. 8 shows an example of a storage area structure of an address book 30 stored in the hold memory 205 according to a fourth embodiment.

FIG. 8 shows an example of a storage area structure of an address book 30 stored in the hold memory 205 according to the fourth embodiment.

In the address book 10 according to the first embodiment, at least one piece of attribute information ATTm is associated with each of the data sections 11-1 to 11-n as the information that allows a user to easily specify (recognize) a communication counterpart that can be either of a destination of communication and a source of communication. On the other hand, in the address book 30 according to this embodiment, attribute information ATTc can be associated with each of data sections 31-1 to 31-n.

More specifically, in each of the data sections 31-1 to 31-n of the address book 30, the telephone number fields 22-1 to 22-k have attribute fields 41-1 to 41-k, respectively. Also, the e-mail address fields 23-1 to 23-m have attribute fields 42-1 to 42-m, respectively. By operating the operation unit 207, a user can set the attribute information ATTc in the attribute fields 41-1 to 41-k and 42-1 to 42-m. According to the setting operation, the CPU 200 performs registrations for each of the data sections 31-1 to 31-n such that a given e-mail address in association with a given piece of attribute information ATTc.

Note that the term "attribute information ATTc" represents information that allows a user to easily specify each destination such as a telephone number or an e-mail address. More specifically, there are cases where a user wishes to register a plurality of telephone numbers allowing a telephone call for a given single communication counterpart. In such cases, according to this embodiment, in order to specify the plurality of telephone numbers with ease, as shown in FIG. 8, the user can register information such as "mobile telephone", "home", or "company", as the attribute information ATTc, for each telephone number (the same applies to each e-mail address).

As described above, in the address book 30, each telephone number and each e-mail address can be associated with the attribute information ATTc.

Figure 9:
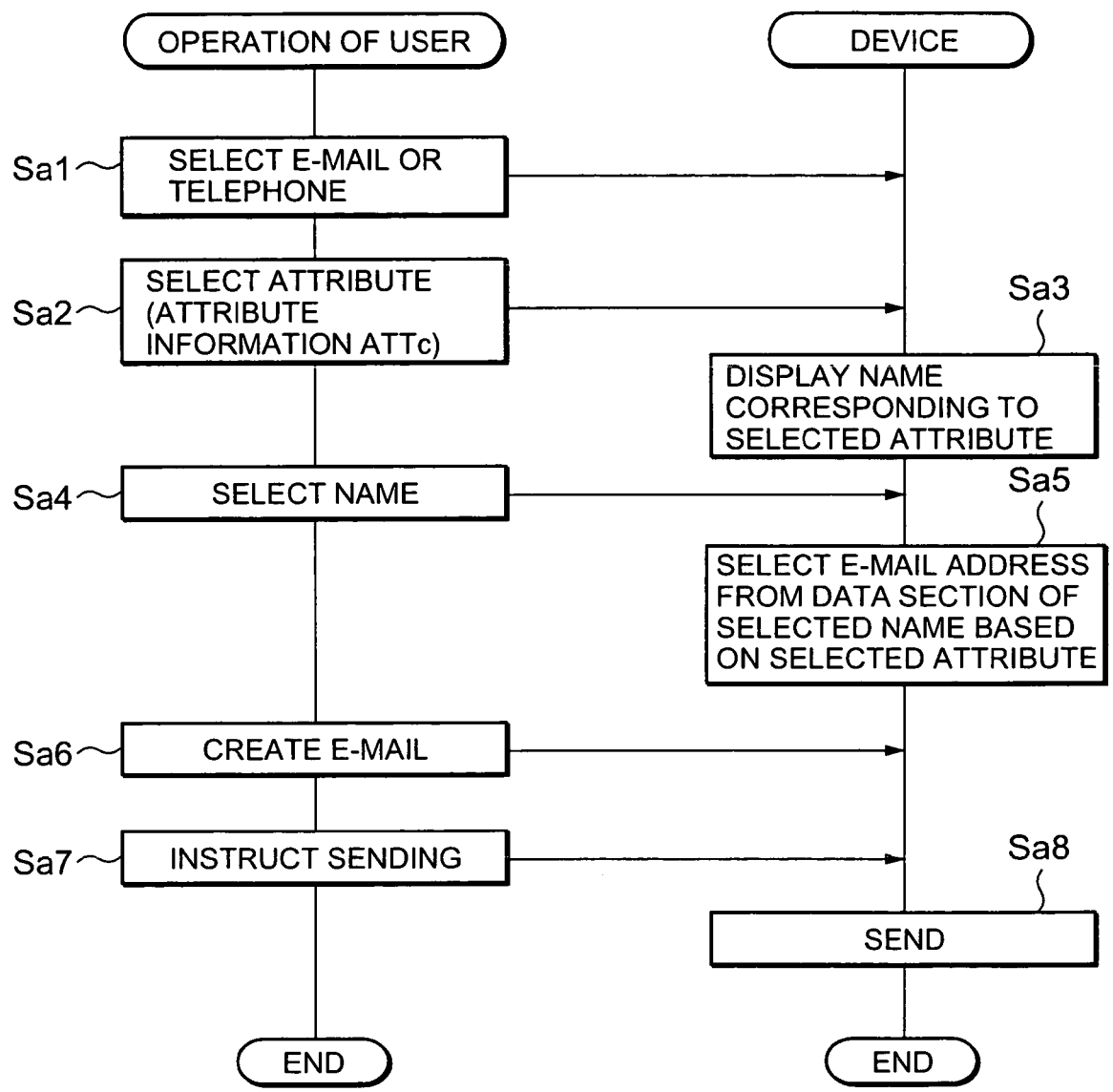
FIG. 9 is a flow chart of an e-mail sending processing performed on the mobile telephone 100 according to the fourth embodiment along with an operation procedure for a user (for sending an e-mail in response to an attribute selecting operation)
Figure 10:
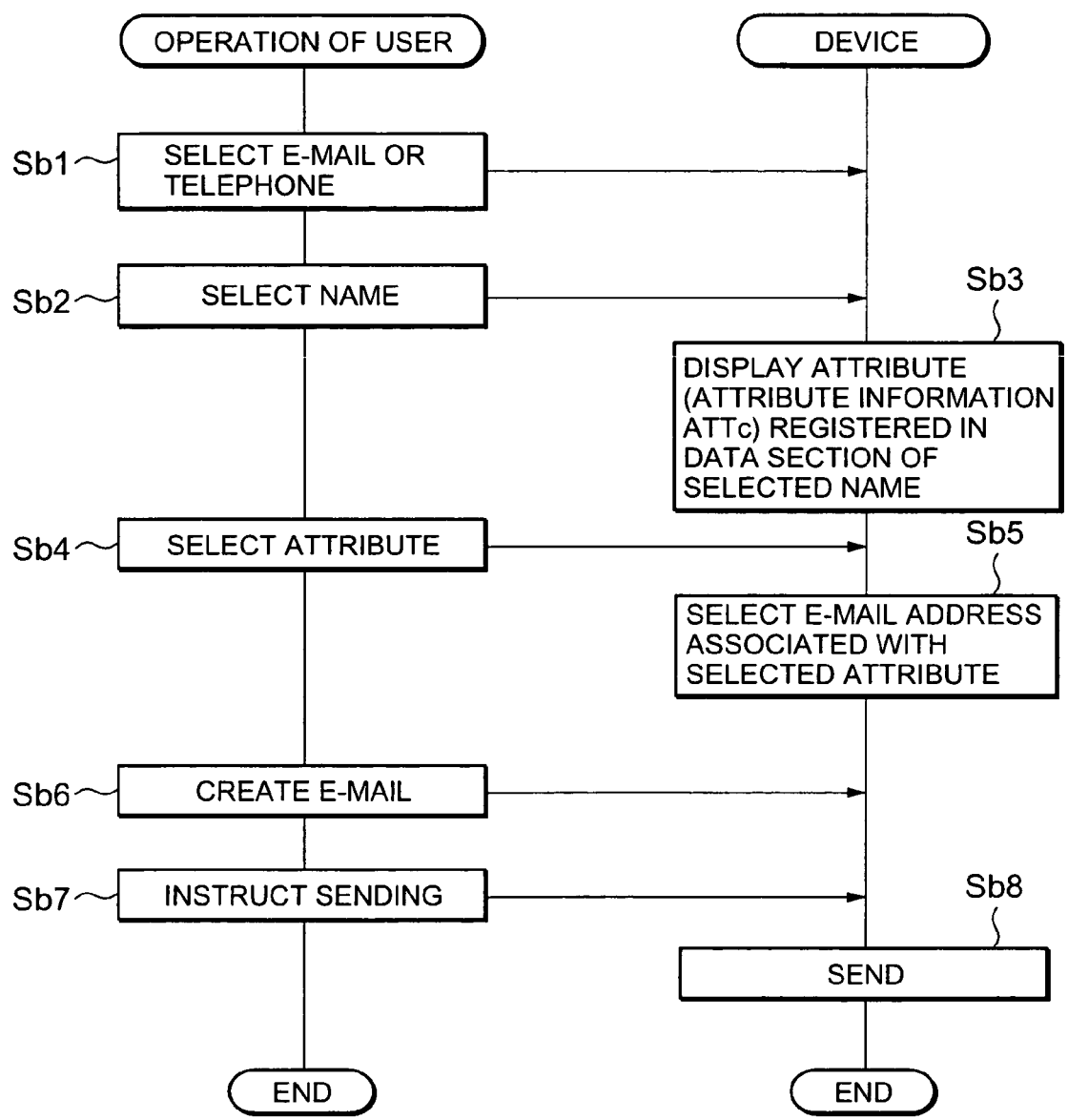
FIG. 10 is a flow chart of another e-mail sending processing performed on the mobile telephone 100 according to the fourth embodiment along with another operation procedure for a user (for sending an e-mail in response to the attribute selecting operation after selection of a name).

After that, in this embodiment, the CPU 200 of the control unit 203 executes a processing shown in flow charts of FIGS. 9 and 10.

In this embodiment, in the case where a user wishes to send e-mails with identical contents to a plurality of communication counterparts, the user first designates a desired piece of attribute information ATTc (for example, "home") in the "communication counterpart selection mode". Accordingly, even if a plurality of e-mail addresses are registered for a given single communication counterpart, the CPU 200 of the control unit 203 can automatically select an e-mail address intended by the user.

Note that the pieces of attribute information ATTc, which are individually assigned to each of telephone numbers and e-mail addresses in the data sections 31-1 to 31-n of the address book 30, are not limited to arbitrary attributes set by a user. For example, the device configuration may be adapted such that predetermined attributes such as "home", "company", and "mobile telephone" are registered within the mobile telephone 100 in advance so as to be selected as the attribute information ATTc. Alternatively, the device configuration may be adapted so as to realize a combination of the configuration in which the desired attributes can be registered by a user in advance and the configuration in which the predetermined attributes can be registered in advance as the standard specifications.

Hereinafter, description will be made of an operation according to this embodiment with reference to FIGS. 9 and 10.

FIGS. 9 and 10 are each a flow chart of an e-mail sending processing performed on the mobile telephone 100 according to the fourth embodiment along with an operation procedure for a user. The flow charts each show a processing procedure of a software program executed by the CPU 200 of the control unit 203 shown in FIG. 1.

First, FIG. 9 is referenced for describing the processing procedure for sending an e-mail in response to the attribute selecting operation performed by a user.

In this case, a user selects whether an e-mail is to be sent or a telephone call is to be originated (step Sa1). Herein, the selection is made of the e-mail sending.

The user further selects an attribute representing a destination address of a communication counterpart to which the user wishes to send an e-mail (step Sa2). More specifically, instep Sa2, the CPU 200 displays, on the display unit 208, plural pieces of attribute information ATTc from which the user can select one as the attribute representing a destination address of a communication counterpart to which the user wishes to send an e-mail. The pieces of attribute information ATTc displayed here as selection options include attributes set in advance in the "attribute setting mode" such as "mobile telephone", "home", and "company". By operating the operation unit 207, the user selects, from the plural pieces of attribute information ATTc, a desired one that the user considers to represent the communication counterpart to which the user wishes to send an e-mail.

It is noted that a selecting operation for attribute information ATTc performed in step Sa2 includes a case of selecting a plurality of attributes by using a Boolean expression as well.

Subsequently, the CPU 200 of the control unit 203 first searches the data sections 31-1 to 31-n of the address book 30 to thereby specify identification information ID associated with the piece of attribute information ATTc selected in step Sa2. Then, the CPU 200 displays a name registered in the name field 20 as the identification information ID on the display unit 208 (step Sa3). In the case where the piece of attribute information ATTc is associated with the plurality of communication counterparts in the address book 30, a plurality of names of candidates for communication counterparts for e-mail sending are displayed in step Sa3.

Then, the user uses the operation unit 207 to select a name of the communication counterpart to which the user wishes to send an e-mail (step Sa4). In the case of sending e-mails with identical contents to a plurality of communication counterparts, the user may select a desired one from the plurality of names being displayed in step Sa4.

The CPU 200 of the control unit 203 references one of the data sections 31-1 to 31-n, in which the name (communication counterpart) selected in step Sa4 is registered, to thereby select an e-mail address associated with the piece of attribute information ATTc selected in advance in step Sa2 (step Sa5).

Subsequently, the user uses the operation unit 207 to prepare contents that the user wishes to send in an e-mail format, and performs a predetermined operation to temporarily store the prepared contents (text information or the like) within the hold memory 205 (step Sa6). After that, the user gives a predetermined sending instruction in order to send the temporarily stored contents by e-mail (step Sa7).

In response to the operation performed by the user in Sa7, the CPU 200 sends e-mails with identical contents to e-mail addresses selected above in step Sa5 (step Sa8).

Accordingly, in the mobile telephone 100 according to this embodiment, the attribute information ATTc representing the destination of a communication counterpart can be registered in each of the data sections 31-1 to 31-n of the address book 30 in association with each e-mail address.

According to the above e-mail sending processing (FIG. 9), even if a plurality of e-mail addresses are registered in the address book 30 for one name (one of the data sections 31-1 to 31-n), a user utilizes the attribute information ATTc associated with individual e-mail addresses, thereby making it possible to select a suitable e-mail address by a simple operation without fail.

Next, FIG. 10 is referenced for describing the processing procedure for sending an e-mail in response to the attribute selecting operation performed after selection of a name of a communication counterpart by a user.

Similarly to step Sa1, a user selects whether an e-mail is to be sent or a telephone call is to be originated (step Sb1) Herein, the selection is made of the e-mail sending.

At this time, the CPU 200 references the address book 30 to thereby cause the names of communication counterparts registered in the name fields 20 of the data sections 31-1 to 31-n to be displayed on the display unit 208 as a list. Then, the user selects the name of a communication counterpart to which the user wishes to send an e-mail from the displayed list (step Sb2).

The CPU 200 of the control unit 203 searches the address book 30 to thereby specify one of the data sections 31-1 to 31-n in which the name (identification information ID) selected in step Sb2. Then, the CPU 200 displays pieces of attribute information ATTc associated with all e-mail addresses within the one of the data sections 31-1 to 31-n on the display unit 208 (step Sb3). In other words, in step Sb3, in the case where a plurality of e-mail addresses are registered in the one of the data sections 31-1 to 31-n, the display is made of all the pieces of attribute information ATTc (such as "company", "home", and "mobile telephone") associated with the individual e-mail addresses.

The user then selects, from all the displayed pieces of attribute information ATTc, a piece of attribute information ATTc that the user considers to represent a destination address to which the user wishes to send an e-mail (step Sb4).

The control unit 203 selects the e-mail address of the selected name, the address being associated with the attribute (step Sb5).

The user uses the operation unit 207 to prepare contents that the user wishes to send in an e-mail format, and performs the predetermined operation to temporarily store the prepared contents (text information or the like) within the hold memory 205 (step Sb6). After that, the user gives the predetermined sending instruction in order to send the temporarily stored contents by e-mail (step Sb7).

In response to the operation performed by the user in Sb7, the CPU 200 sends an e-mail to the e-mail address selected above in step Sb5 (step Sb8).

According to the above e-mail sending processing (FIG. 10), even if a plurality of e-mail addresses are registered for one name (one of the data sections 31-1 to 31-n), a user performs the selecting operation for the attribute information ATTc associated with individual e-mail addresses, thereby making it possible to select a suitable e-mail address by a simple operation without fail.

That is, even if the user forgets the relationships between e-mail addresses and names (identification information ID) that are registered in the address book 30, a suitable e-mail address can be selected with ease by designating a piece of attribute information ATTc that the user considers to represent a destination address to which the user wishes to send an e-mail.

(Modification 1 of the Fourth Embodiment)

In Modification 1 of the fourth embodiment, an e-mail address or telephone number is retrieved by a configuration in which selection thereof can be made by a user by using, as search conditions, information including a sex and an address registered in the address book 30 (FIG. 8) as well as the attribute information ATTc. According to the modification 1, the operability is further improved for a user.

(Modification 2 of the Fourth Embodiment)

Alternatively, in Modification 2 of the fourth embodiment, the identification information ID and at least one piece of attribute information ATTm can be registered in the address book 30 shown in FIG. 8 in association with each other. In this modification, the address book 30 having data associated with the attribute information ATTm is referred to as an address book 30A (not shown). Also, the address book 30A is composed of a plurality of data sections 31A. As described above in the first embodiment, the attribute information ATTm is the information (including "company", "project team", and "friend") that allows a user to easily specify a communication counterpart that can be either of a destination of communication and a source of communication.

In the modification 2, upon the retrieval of an e-mail address or telephone number, the CPU 200 first utilizes the attribute information ATTm (first attribute information) to perform the retrieval processing similarly to the first embodiment, thereby retrieving a data section corresponding to the attribute information ATTm from the plurality of data sections 31A within the address book 30A. Herein, the retrieved data section 31A can be obtained, for example, as the identification information ID that can specify the individual data sections.

Then, the CPU 200 performs a retrieval processing, which utilizes the attribute information ATTc (second attribute information) similarly to the fourth embodiment, on only the data sections 31A retrieved through the retrieval processing based on the attribute information ATTm.

According to the modification 2, even if a large number of data sections 31A for communication counterparts are registered in the address book 30A, it is possible to reduce required time taken for retrieving a destination (e-mail address or telephone number) suitable for a user compared with that in the fourth embodiment utilizing only the attribute information ATTc. Accordingly, the operability is further improved for a user.

As described above, according to the respective embodiments and their modifications, it is possible to register plural pieces of attribute information (ATTm and ATTc) in the data sections 11-1 to 11-n and 31-1 to 31-n, respectively, which are allocated for each piece of identification information ID indicating either of a destination of communication and a source of communication. Accordingly, by utilizing the attribute information in association with other information within the same data section, the operability can be improved for a user in communication functions of a mobile telephone.

Note that in the above respective embodiments, the description has been made of the cases of applying the present invention to a mobile telephone. However, the present invention is not limited to the mobile telephone, and may be preferably applied to a mobile communication terminal such as a PDA (Personal Digital Assistance).

Further, the present invention is not limited to the mobile communication terminal, and in the case of being applied to an information processor (for example, a personal computer) having a wire communication function, the operability can be improved for a user substantially in the same manner as the above respective embodiments.

According to the respective embodiments as have been described above, by utilizing pieces of identification information indicating either of a destination of communication and a source of communication and plural pieces of attribute information registered in association with for each of the pieces of identification information, the operability can be improved for a user in the communication functions provided to a mobile communication terminal.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A mobile communication terminal which is used for making a telephone call to a telephone number or sending an email to an e-mail address, the telephone number and the email address each being selected by a user as a destination for a desired communication counterpart from a storage area storing at least one of the telephone number and the e-mail address, the mobile communication terminal comprising:

input means allowing the user to input:
identification information representing a communication counterpart that can be at least one of a destination of communication and a source of communication,
attribute information allowing the user to specify the communication counterpart, and
at least one of the telephone number and the e-mail address as the destination for the communication counterpart;
storage means for storing the identification information, the attribute information, and at least one of the telephone number and the e-mail address, which are inputted through said input means, in the storage area in association with one another; and
communication control means for, by searching the storage area based on one of the attribute information inputted by the user, retrieving the identification information associated with the inputted attribute information, and setting one of the telephone number and the e-mail address, which is associated with the retrieved identification information, as the destination of communication, wherein:
said storage means capable of storing, as profile information of the user who uses the mobile communication terminal, the identification information representing the user and at least one of the telephone number and the e-mail address as the destination for the user in association with each other;
the mobile communication terminal further comprises profile exchanging means for exchanging profile information with an external device; and
in response to obtaining the profile information of another party from the external device, said storage means further stores, in the storage area, the profile information of the other party in association with a predetermined piece of the attribute information indicating that the profile information has been obtained by said profile exchanging means.

2. The mobile communication terminal according to claim 1, wherein, in response to updating the profile information of the user, said profile exchanging means, by searching the storage area with the predetermined piece of the attribute information being used as a search key, specifies the profile information of the other party associated with the predetermined piece of the attribute information, and sends the updated profile information of the user to the e-mail address included in the profile information of the other party.

3. The mobile communication terminal according to claim 2, wherein, when the profile information of the other party is obtained from the external device, in a case where the profile information of the other party has already been stored in the storage area, the storage means updates the already stored profile information into the updated profile information.

4. A mobile communication terminal comprising:
storage means for storing, in a storage area, i) first profile information of a communication counterpart, which first profile information includes identification information representing the communication counterpart, attribute information to specify the communication counterpart and an e-mail address as destination information of the communication counterpart, and ii) second profile information of the user who uses the mobile communication terminal, which second profile information includes the identification information representing the user and at least one of a user telephone number and a user e-mail address as the destination information of the user;
communication control means for, by searching the first profile information stored in the storage area based On one of the attribute information specified, retrieving the identification information associated with the specified attribute information, and setting the email address, which is associated with the retrieved identification information, as the destination of communication; and
profile exchanging means for exchanging the second profile information with an external device,
wherein, in response to obtaining the second profile information of another party from the external device, said storage means further stores the second profile information of the another party as the first profile information in the storage area in association with a predetermined piece of the attribute information indicating that the first profile information has been obtained by said profile exchanging means.

5. The mobile communication terminal according to claim 4, wherein, said profile exchanging means includes an infrared communication unit for communicating with another mobile communication terminal by using infrared rays.

6. The mobile communication terminal according to claim 4, wherein, in response to updating the second profile information, said communication control means, by searching the first profile information stored in the storage area with the predetermined piece of the attribute information being used as a search key, retrieves the first profile information associated with the predetermined piece of the attribute information, and sends an e-mail with the updated second profile information to the e-mail address included in the first profile information having been retrieved.

7. The mobile communication terminal according to claim 6, wherein, said e-mail is created by the communication control means in a predetermined format which indicates the second profile information has been updated.

8. The mobile communication terminal according to claim 7, wherein, when said e-mail with the updated second profile information is received, said storage means replaces the first profile information having been stored in the storage area by the updated second profile information of the other party contained in the received e-mail.

9. A selection method for communication counterpart information to be used by a mobile communication terminal, which has a storage area for storing first profile information of a communication counterpart, which includes identification information representing the communication counterpart, attribute information to specify the communication counterpart and the e-mail address as destination information of the communication counterpart, and second profile information of the user who uses the mobile communication terminal, which includes the identification information representing the user and at least one of the telephone number and the email address as the destination information of the user, the method comprising:

exchanging the second profile information with another party through profile exchanging means which includes an infrared communication unit for communicating with another mobile communication terminal by using infrared rays;

storing the second profile information of the another party as the first profile information in the storage area in association with a predetermined piece of the attribute information indicating that the first profile information has been obtained through said profile exchanging means; and selecting communication counterpart information by searching the first profile information stored in the storage area based on one of the attribute information specified, retrieving the identification information associated with the specified attribute information, and setting the e-mail address, which is associated with the retrieved identification information, as the destination of communication.

10. The selection method for communication counterpart information according to claim 9, wherein, when the second profile information is updated, the method further comprises:

searching the first profile information stored in the storage area with the predetermined piece of the attribute information being used as a search key;

retrieving the first profile information associated with the predetermined piece of the attribute information;

creating an email having a predetermined format which indicates the second profile information has been updated; and sending the e-mail with the updated second profile information to the e-mail address included in the first profile information having been retrieved.

11. The selection method for communication counterpart information according to claim 10, wherein, when the e-mail with the updated second profile information is received, the method further comprises:

replacing the first profile information having been stored in the storage area by the updated second profile information of the other party contained in the received email.

* * * * *